United States Patent [19]
Berstis et al.

[11] Patent Number: 5,867,154
[45] Date of Patent: Feb. 2, 1999

[54] METHOD AND APPARATUS TO SELECT A DISPLAY AREA WITHIN A DATA PROCESSING SYSTEM

[75] Inventors: Viktors Berstis, Austin; Manish Mahesh Modh, Round Rock, both of Tex.

[73] Assignee: International Business Machines Corporation, Armonk, N.Y.

[21] Appl. No.: 797,078

[22] Filed: Feb. 10, 1997

[51] Int. Cl.$^6$ ........................................................ G06F 3/00
[52] U.S. Cl. ............................................ 345/327; 345/342
[58] Field of Search .................................. 345/327, 333, 345/334, 339, 340, 342

[56] References Cited

U.S. PATENT DOCUMENTS

| | | | |
|---|---|---|---|
| 4,394,690 | 7/1983 | Kobayashi | 358/180 |
| 4,951,149 | 8/1990 | Faroudja | 358/230 |
| 5,146,335 | 9/1992 | Kim et al. | 358/183 |
| 5,263,134 | 11/1993 | Paal et al. | |

OTHER PUBLICATIONS

"Shrunken Screens," Computer Reseller News, 1997, n. 753, p. 157.
Buehler, S., Nokia Multigraph 447Xav Delivers Sight and Sound, PC Magazine, Jun. 1996, V.15, No. 12, P56 (1).
"Texas Instruments Video Decoder/Encoder Chips," News bytes, Nov. 1997.
Castagna, R., "Head to Head," Windows Magazine, 1996, n. 702, p. 112.
Powell, J. E., "Head to Head: LCD Monitors," Windows Magazine, 1997, n. 810, p. 169.
O'Brien, B., "Taking Computing Power to the Limit," Computer Shopper, V16, n16, P502 (2), 1997 (Dec.).

*Primary Examiner*—A. Katbab
*Attorney, Agent, or Firm*—David A. Mims, Jr.; Daniel E. Venglarik; Andrew J. Dillon

[57] ABSTRACT

A process for use in a data processing system to define a display area within a display device in the data processing system. The display device includes an unviewable portion and a viewable portion in which a plurality of borders define the viewable portion of the display. The process includes displaying a line or some other graphical object parallel to the border within the plurality of borders in the display device. The line is moved relative to the border in response to a user input wherein the line remains parallel to the border. The line is fixed in response to a second user input. Additional lines are displayed, moved, and fixed for the remaining borders forming the viewable portion of the display, resulting in the definition of a display area. This display area is stored and employed to display data on the display device such that data is not displayed in the unviewable portion of the display device.

18 Claims, 16 Drawing Sheets

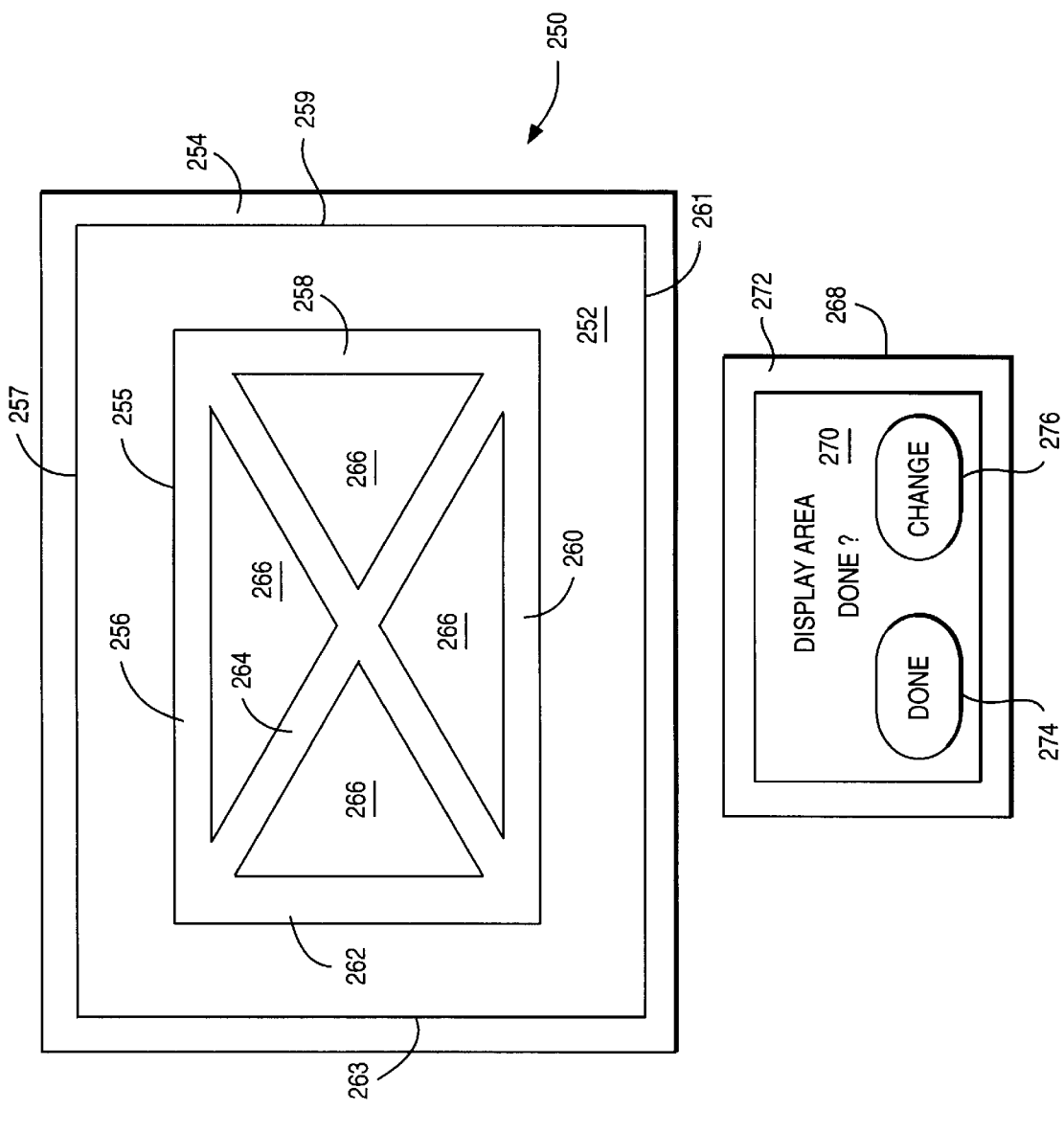

METHOD AND APPARATUS TO SELECT A DISPLAY AREA WITHIN A DATA PROCESSING SYSTEM

BACKGROUND OF THE INVENTION

1. Technical Field

The present invention relates in generally to an improved data processing system and in particular to an improved method for manipulating data in a data processing system through a graphics user interface. Still more particularly, the present invention relates to improvements in a graphic user interface for selecting a display region in a display device within a data processing system.

2. Description of the Related Art

The manipulation of data in a data processing system is well know in the prior art. Data may be manipulated in many ways in a modern state-of-the-art data processing system including: data accessing, data encoding, data communications, data compression, data conversation, data entry, data exchange, data filing, data linking, data locking, data manipulation, data mapping, data modeling, data processing, data recording, data sorting and data transferring. The large amounts of data that are available to the user of a modern state-of-the-art data processing system often become overwhelming in magnitude and complexity. These situations may often arise in the creation and execution of multimedia presentations.

Data processing systems are capable of communicating information to users in may formats, including: text, graphics, sounds, animated graphics, synthesized speech, and video. Multimedia presentations employ a data processing system to combine such information formats into a coherent and comprehensive presentation to the user.

As a result of the increasing complexity of data processing systems and with the introduction of multimedia presentations, attempts have been made to simplify the interface between a user and the large amounts of data present within a modern data processing system. One example of an attempt to simplify the interface between a user and a data processing system is the utilization of a so-called graphic user interface (GUI) to provide an intuitive and graphical interface between the user and the data processing system. A GUI is an interface system, including devices, by which a user interacts with a system, system components, and/or system applications via windows or view ports, icons, menus, pointing devices, etc.

Using data processing systems to access the internet and in particular the world wide web has become an increasingly common use of a data processing system. Typically personal computers (PCs) along with workstations are typically used to access the internet. The cost and complexity of these types of data processing systems, however, have prevented some people from being able to access the internet. The network computer (NC), internet appliance, web PC, internet access device, browser box, set-top box, etc. are all names for the same concept with minor variations. In particular, the concept is to provide a low cost data processing system that discards over weight operating systems and bloated, platform-specific applications. Instead, many of these new data processing system run a microkernal operating system and platform independent software written in an interpreted language such as JAVA. In theory, an NC can perform any function a PC, except it will cost less for the hardware and software. Connectivity costs, however, may differ. To provide an NC, vendors must focus on four technologies, which include low cost, speedy microprocessors, light weight system software and component ware, platform-independent programming languages, and fast affordable access to networks.

In addition, the use of NCs would allow for cheaper terminals for large businesses in addition to providing lower cost systems for other users who traditionally do not purchase PCs.

In displaying images using an NC or a PC, the display device often must be adjusted to insure that all of the image or data are displayed to the user. Such an adjustment may be necessary because when the display device is in the form of a cathode ray tube (CRT), the housing for the CRT may cover portions of the display area. Display devices designed especially for use with a PC include controls on the display device to adjust the area in which the images and data are displayed. In the case of an NC, in some instances the NC may be connected to a television rather than a display device especially designed for use with a PC. Typical televisions, however, do not provide controls for adjusting the display on the screen. Instead, portions of images are blocked by the housing for the screen. Additionally, although typical display devices designed for use with PCs have controls for adjusting the portion of the screen on which image is displayed, using those controls may be cumbersome or inefficient depending on where the user is sitting in relation to the display device or what controls are provided on the display device. Therefore, it would be advantageous to have an improved method and apparatus for selecting a display area within a display device.

SUMMARY OF THE INVENTION

It is one objective of the present invention to provide an improved data processing system.

It is another objective of the present invention to provide an improved method for manipulating data in a data processing system.

It is yet another objective of the present invention to provide an improved graphic user interface for selecting a display region in a display device within a data processing system.

The foregoing objectives are achieved as follows. The present invention provides a process for use in a data processing system to define a display area within a display device in the data processing system. The display device includes an unviewable portion and a viewable portion in which a plurality of borders define the viewable portion of the display. The process includes displaying a line or some other graphical object parallel to the border within the plurality of borders in the display device. The line is moved relative to the border in response to a user input wherein the line remains parallel to the border. The line is fixed in response to a second user input. Additional lines are displayed, moved, and fixed for the remaining borders forming the viewable portion of the display, resulting in the definition of a display area. This display area is stored and employed to display data on the display device such that data is not displayed in the unviewable portion of the display device.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

FIGS. 3A–3F are diagrams illustrating the selection of a display area according to the present invention;

DETAILED DESCRIPTION OF THE PREFERRED EMBODIMENT

Figure 1A:
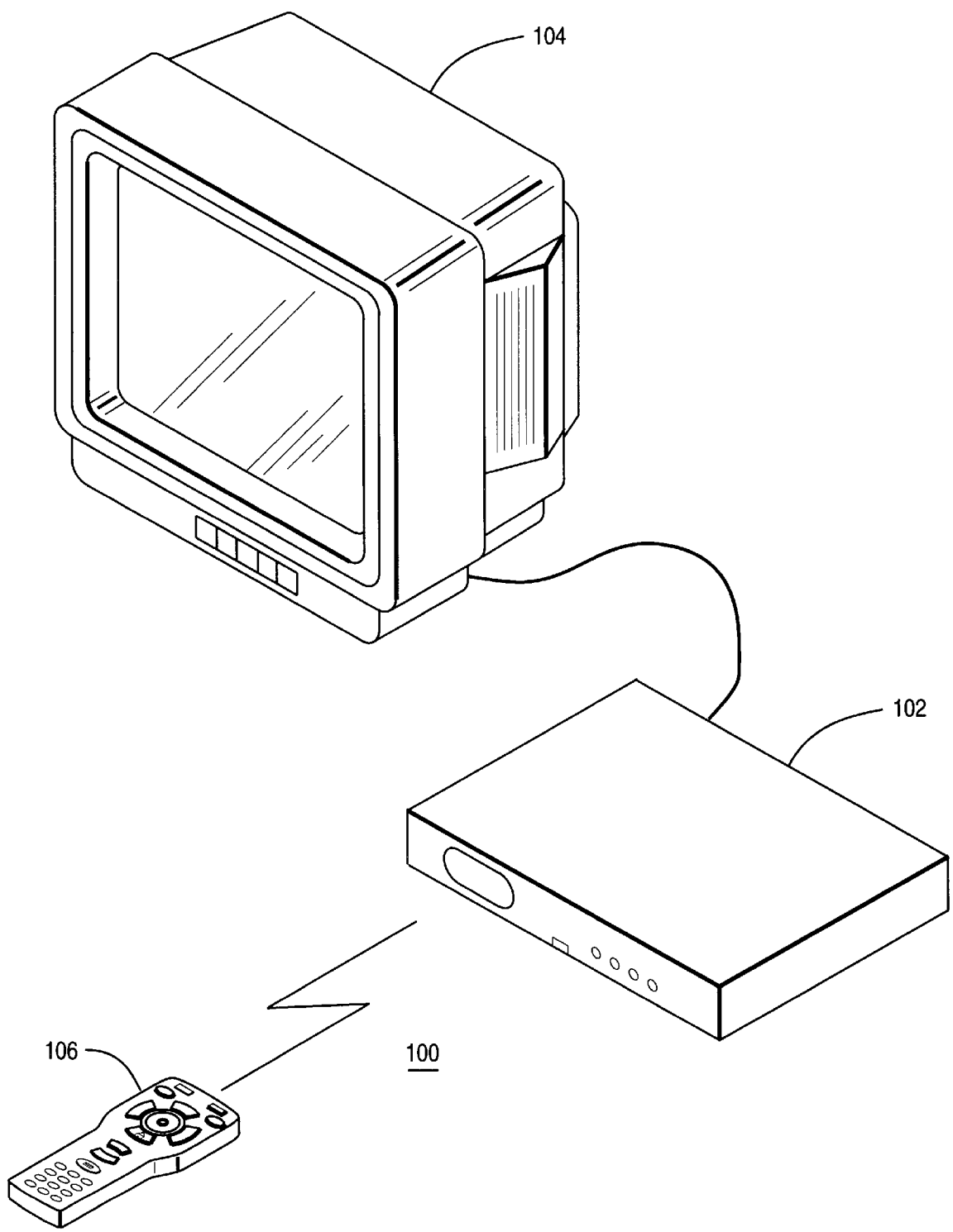
FIGS. 1A–1D depict various pictorial representations of a data processing system in which a preferred embodiment of the present invention may be implemented.

With reference now to the figures, and in particular with reference to FIGS. 1A through 1D, various pictorial representations of a data processing system in which a preferred embodiment of the present invention may be implemented are depicted. FIG. 1A is a pictorial representation of the data processing system as a whole. Data processing system 100 in the depicted example provides, with minimal economic costs for hardware to the user, access to the Internet. Data processing system 100 includes a data processing unit 102. Data processing unit 102 is preferably sized to fit in typical entertainment centers and provides all required functionality, conventionally found in personal computers, to enable a user to "browse" the Internet. Additionally, data processing unit 102 may provide other common functions such as serving as an answering machine or receiving facsimile transmissions.

Data processing unit 102 is connected to television 104 for display of graphical information. Television 104 may be any suitable television, although color televisions with an S-Video input will provide better presentations of the graphical information. Data processing unit 102 may be connected to television 104 through a standard coaxial cable connection. A remote control unit 106 allows a user to interact with and control data processing unit 102. Remote control unit 106 emits infrared (IR) signals, preferably modulated at a different frequency than the normal television, stereo, and VCR infrared remote control frequencies in order to avoid interference. Remote control unit 106 provides the functionality of a pointing device in conventional personal computers, including the ability to move a cursor on a display and select items.

Figure 1B:
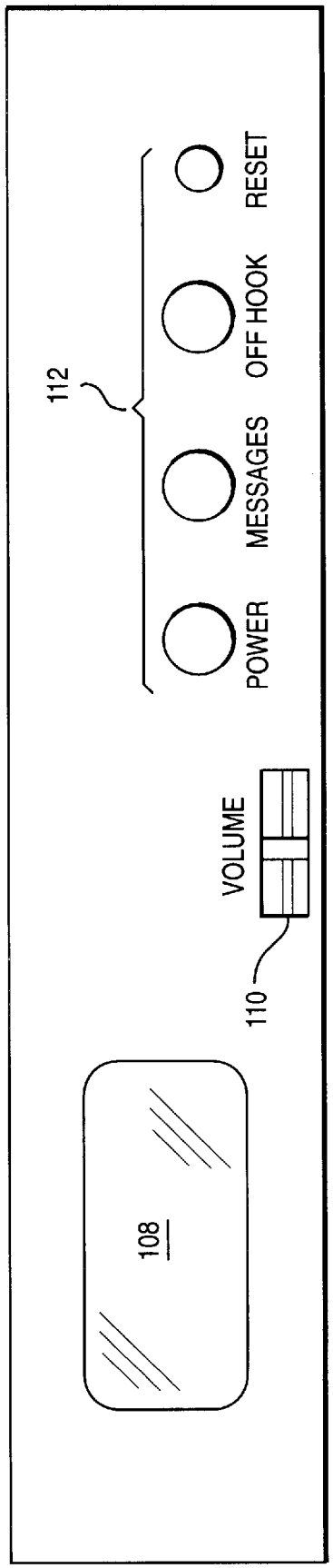

FIG. 1B is a pictorial representation of the front panel of data processing unit 102 in accordance with a preferred embodiment of the present invention. The front panel includes an infrared window 108 for receiving signals from remote control unit 106 and for transmitting infrared signals. Data processing unit 102 may transmit infrared signals to be reflected off objects or surfaces, allowing data processing unit 102 to automatically control television 104. Volume control 110 permits adjustment of the sound level emanating from a speaker within data processing unit 102 or from television 104. A plurality of light-emitting diode (LED) indicators 112 provide an indication to the user of when data processing unit 102 is on, whether the user has messages, whether the modem/phone line is in use, or whether data processing unit 102 requires service.

Figure 1C:
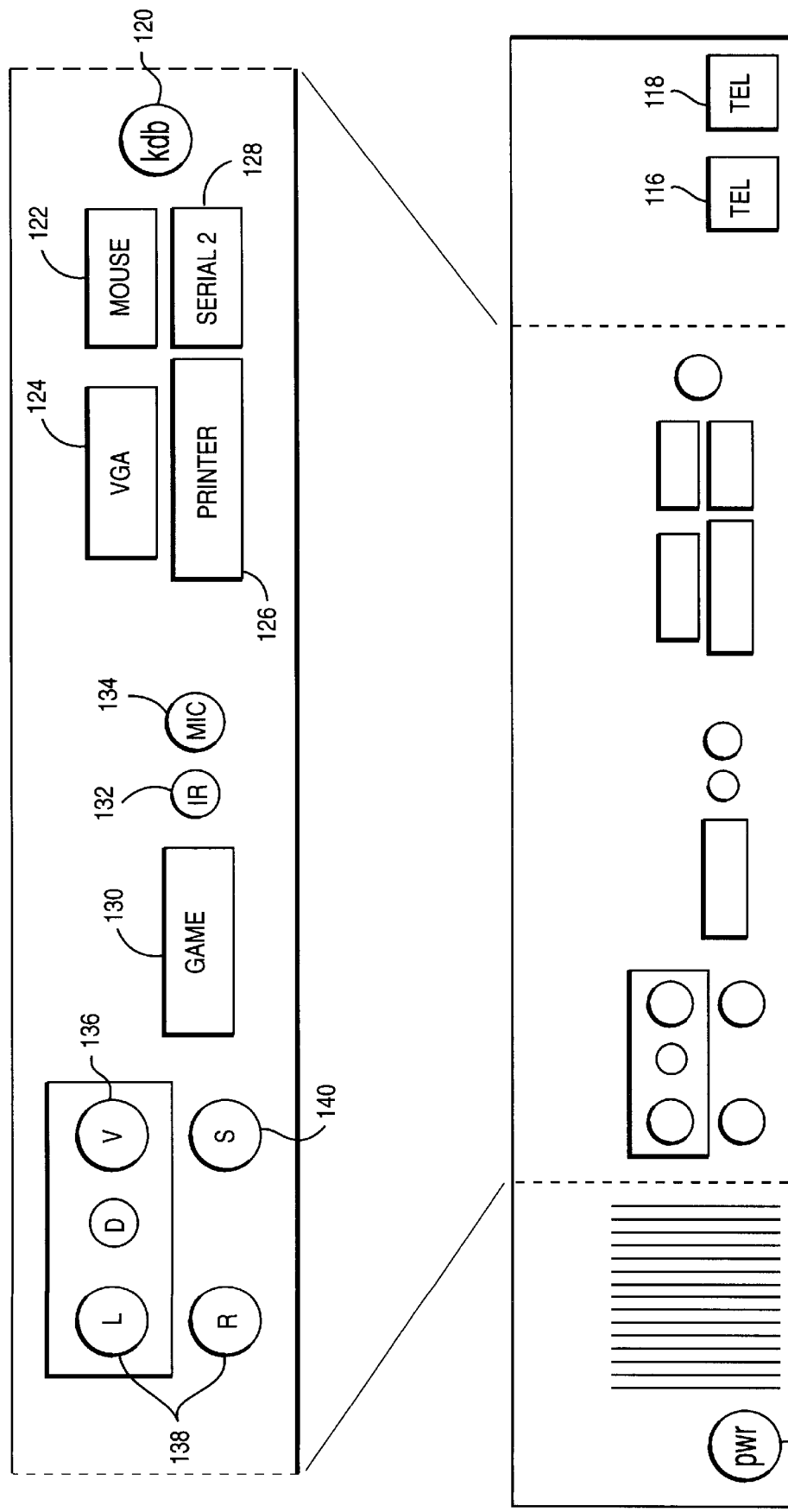

FIG. 1C is a pictorial representation of the rear panel of data processing unit 102 in accordance with a preferred embodiment of the present invention. A three wire (ground included) insulated power cord 114 passes through the rear panel. Standard telephone jacks 116 and 118 on the rear panel provide an input to a modem from the phone line and an output to a handset (not shown). The rear panel also provides a standard computer keyboard connection 120, mouse port 122, computer monitor port 124, printer port 126, and an additional serial port 128. These connections may be employed to allow data processing unit 102 to operate in the manner of a conventional personal computer. Game port 130 on the rear panel provides a connection for a joystick or other gaming control device (glove, etc.). Infrared extension jack 132 allows a cabled infrared LED to be utilized to transmit infrared signals. Microphone jack 134 allows an external microphone to be connected to data processing unit 102.

Video connection 136, a standard coaxial cable connector, connects to the video-in terminal of television 104 or a video cassette recorder (not shown). Left and right audio jacks 138 connect to the corresponding audio-in connectors on television 104 or to a stereo (not shown). If the user has S-Video input, then S-Video connection 140 may be used to connect to television 104 to provide a better picture than the composite signal. If television 104 has no video inputs, an external channel 3/4 modulator (not shown) may be connected in-line with the antenna connection.

Figure 1D:
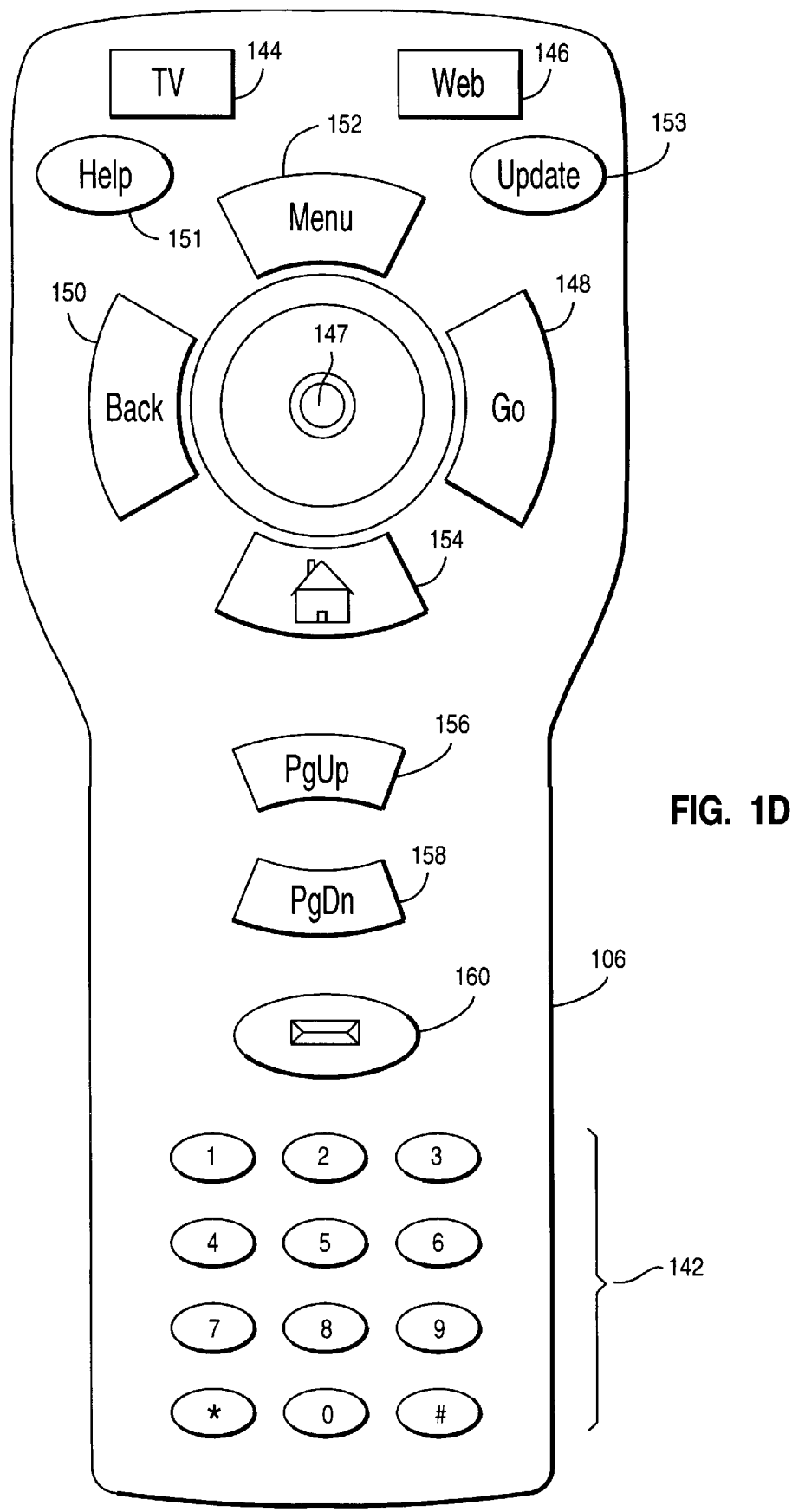

FIG. 1D is a pictorial representation of remote control unit 106 in accordance with a preferred embodiment of the present invention. Similar to a standard telephone keypad, remote control unit 106 includes buttons 142 for arabic numerals 0 through 9, the asterisk or "star" symbol (*), and the pound sign (#). Remote control unit also includes "TV" button 144 for selectively viewing television broadcasts and "Web" button 146 for initiating "browsing" of the Internet. A pointing device, which is preferably a trackpoint or "button" pointing device, is included on remote control unit 106 and allows a user to manipulate a cursor on the display of television 104. "Go" and "Back" buttons 148 and 150, respectively, allow a user to select an option or return to a previous selection. "Menu" button 152 causes a context-sensitive menu of options to be displayed, while home button 154 allows to user to return to a default display of options. "PgUp" and "PgDn" buttons 156 and 158 allows the user to change the content of the display in display-sized blocks rather than by scrolling. The message button 160 allows the user to retrieve messages. In addition to, or in lieu of, remote control unit 106, an infrared keyboard (not shown) with an integral pointing device may be used to control data processing unit 102. The integral pointing device is preferably a trackpoint or button type of pointing device. A wired keyboard (also not shown) may also be used through keyboard connection 120, and a wired pointing device such as a mouse or trackball may be used through mouse port 122. When a user has one or more of the remote control unit 106, infrared keyboard, wired keyboard and/or wired pointing device operable, the active device locks out all others until a prescribed period of inactivity has passed.

Figure 2:
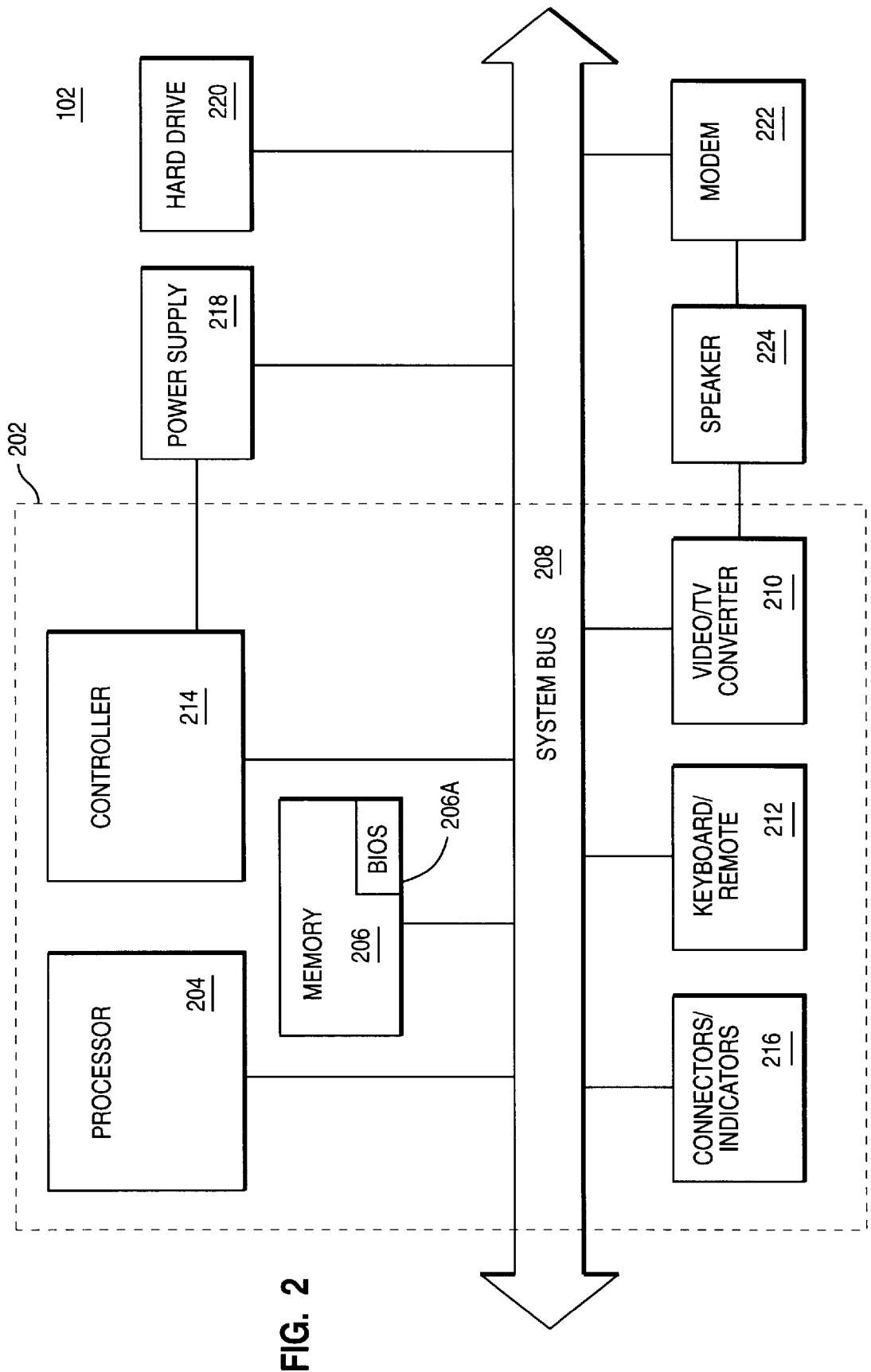
FIG. 2 is a block diagram of components within the data processing system illustrated in FIGS. 1A–1D.

Referring now to FIG. 2, a block diagram for the major components of data processing unit 102 in accordance with a preferred embodiment of the present invention is portrayed. As with conventional personal computers, data processing unit 102 includes a motherboard 202 containing a processor 204 and memory 206 connected to system bus 208. Processor 205 is preferably at least a 486 processor operating at or above 100 MHz. Memory 206 includes read only memory (ROM) 206a containing a basic input/output services (BIOS) routine and may include cache memory and/or video RAM. Video/TV converter 210 on motherboard 202 and connected to system bus 208 generates computer video signals for computer monitors, a composite television signal, and an S-Video signal. Keyboard/remote control interface unit 212 on motherboard 202 receives keyboard codes through controller 214, regardless of whether a wired keyboard/pointing device or an infrared keyboard/remote control is being employed. Infrared remote control unit 106 transmits signals which are ultimately sent to the serial port as control signals generated by conventional mouse or pointing device movements. Two buttons on remote control unit 106 are interpreted identically to the two buttons on a conventional mouse, while the remainder of the buttons transmit signals corresponding to keystrokes on an infrared keyboard. Thus, remote control unit 106 has a subset of the functions provided by an infrared keyboard. Connectors/indicators 216 on motherboard 202 provide the connections and indicators on data processing unit 102 described above.

External to motherboard 202 in the depicted example are power supply 218, hard drive 220, modem 222, and speaker 224. Power supply 218 is a conventional power supply except that it receives a control signal from controller 214 which effects shut down of all power to motherboard 202, hard drive 220, and modem 222. In some recovery situations, removing power and rebooting is the only guaranteed method of resetting all of these devices to a known state. Thus power supply 218, in response to a signal from controller 214, is capable of powering down and restarting data processing unit 102.

Hard drive 220 contains operating system and applications software for data processing unit 102, which preferably includes: IBM DOS 7.0, a product of International Business Machines Corporation In Armonk, N.Y.; Windows 3.1, a product Microsoft Corporation in Redmond, Wash.; and Netscape Navigator, a product of Netscape Communications Corporation in Mountain View, Calif. Data may also be stored on hard drive 220. Modem 222, inserted into a slot mounted sideways on motherboard 202, is preferably a 33.6 kbps modem supporting the V0.42bis, V34bis, V0.34, V0.17 Fax, MNP 1-5, and AT command sets.

Controller 214 is preferably one or more of the 805x family controllers. Controller 214 is continuously powered and, when data processing unit 102 is turned on, monitors the system for a periodic "ping" indicating that data processing unit 102 is operating normally. In the event that controller 214 does not receive a ping within a prescribed timeout period, controller 214 removes power from the system and restarts the system. This may be necessary, for example, when the system experiences a general protection fault. If multiple attempts to restart the system prove unsuccessful, controller 214 shut off data processing unit 102 and signals that service is required through indicators 216. Thus data processing unit 102 is capable of self-recovery without involvement by a user.

Controller 214 also receives and processes input from infrared remote control 106, infrared keyboard, wired keyboard, or wired mouse. When one keyboard or pointing device is used, all others are locked out (ignored) until none have been active for a prescribed period. Then the first keyboard or pointing device to generate activity locks out all others. Controller 214 also directly controls all LED indicators except that indicating modem use and specifies the boot sector selection during any power off-on cycle.

Those skilled in the art will recognize that the components depicted in FIGS. 1A–1D and 2 and described above may be varied for specific applications or embodiments. Such variations in which the present Invention may be implemented are considered to be within the spirit and scope of the present invention.

Figure 3B:
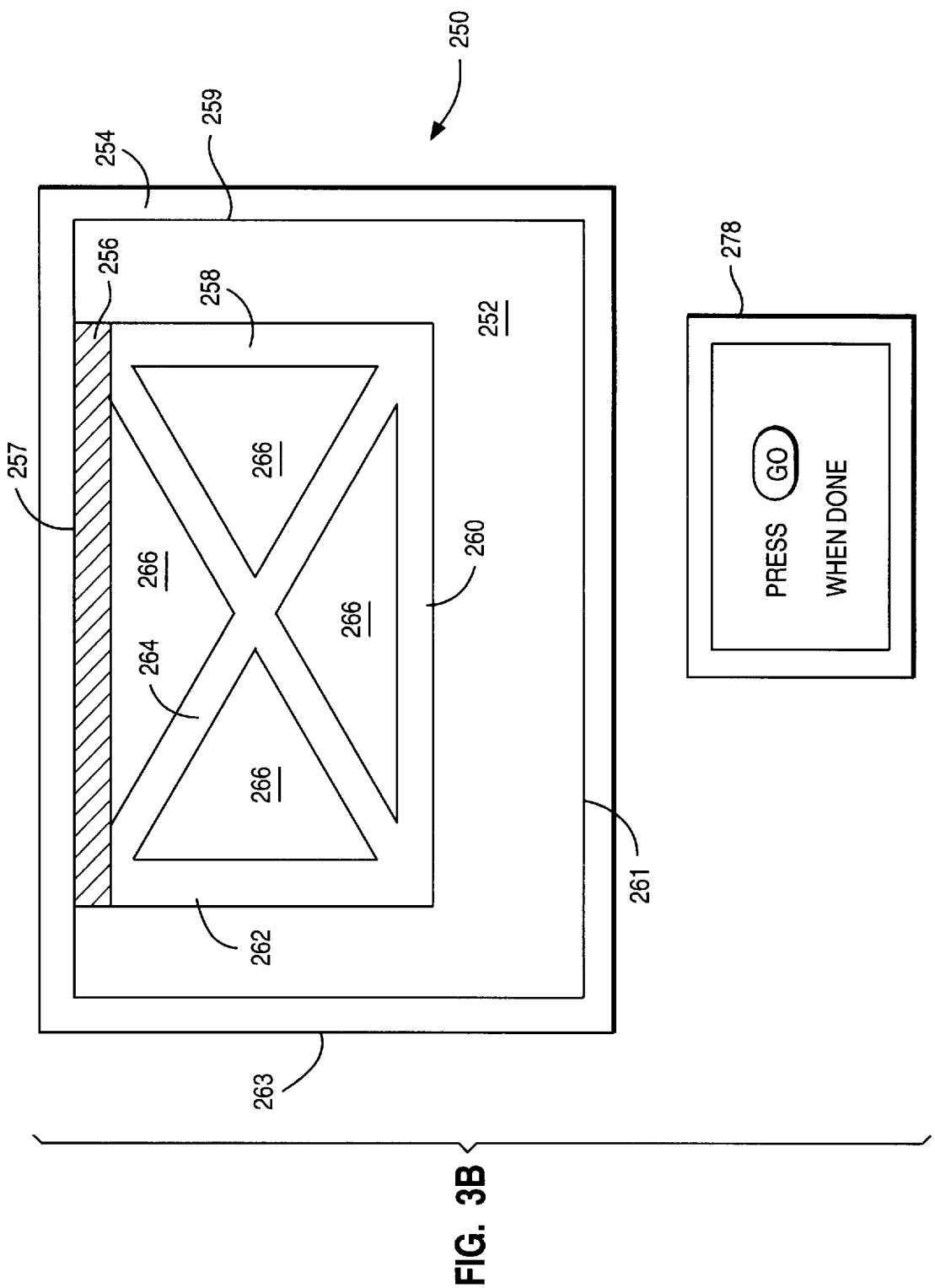

With reference now to FIGS. 3A–3F, diagrams illustrating the selection of a display area are depicted according to the present invention. In FIG. 3A, display device 250 has a screen 252 formed by a CRT in the depicted example. Portions of screen 252 are unviewable by user because of plastic bezel 254, which forms a plurality of borders that cover a portion of screen 252. Plastic bezel 254 is part of a housing used to encase and hold a CRT in display device 250. In this particular case, if the display device is a television rather than a monitor specifically designed for use with a date processing system, controls to adjust the display of data on screen 252 are unavailable to a user. As a result, portions of data, such as images are unviewable by user because of bezel 254. Absent a mechanism to adjust the display of data, the user would be unable to view data displayed under plastic bezel 254.

According to the present invention, a method is provided for selecting a region within screen 252 for displaying data such that a user can view all of the data or have an ability to scroll to data not shown, rather that merely be unable to view the data that might be displayed under plastic bezel 264. A graphical object is used to indicate the edge of the screen in which data will be displayed to a user. The graphical object is used to indicate the edge of the screen relative to one of the borders formed by plastic bezel 254. A border 255 formed by graphical objects in the form of bars 256, 258, 260, and 262 on screen 252 is displayed. The outer periphery of border 255 defines the display area used to display data to a user. Initially, border 255, defining the display area, is pre-selected such that data can be fully displayed on most televisions when used as a display device according to the present invention.

In the depicted example, bar 256 is parallel to top edge 257 of bezel 254, and bar 258 is parallel to right edge 259. Bar 260 is parallel to bottom edge 261, with bar 262 being parallel to left edge 263 of bezel 254. Also displayed within screen 252 is an X 264. Bars 256, 258, 260 and 262, along with X 264, are displayed using the color cyan blue, while background areas 266 are displayed in gray. The remaining portion of screen 252 does not have any color displayed on it. Additionally, message box 268 is displayed within the areas formed by bars 256, 258, 260, and 262. Message block 268 is displayed with a white border 272 and a blue background 270. Instructions are displayed to the user in blue area 270. For example, the user instructions may prompt the user to indicate whether the user is finished adjusting the screen. In the depicted example, the message displayed is "DISPLAY AREA DONE?." Buttons 274 and 276 are provided for the user to indicate a response using a pointing device on remote control unit 106. Button 274 is a "Done" button indicating that the user has finished changing the display area, while button 276 is a "Change" button indicating that the user desires to change the display area.

By pressing button 276, the process displays bar 256 In green to Indicate that it is the bar that may be moved relative to top edge 257 to begin the process of changing the display area defined by border 255. Bar 256 may manipulated using a pointing device such as a mouse or remote control unit 106. In fact, any operating system supporting a graphical user interface pointing device, including, but not limited to, a mouse, track ball, light pen, touch screen, touch pad, and the like may be employed to move bar 256 in the depicted example. A pointing device is typically employed by the user of a data processing system to interact with the data processing system's graphic user interface. A "pointer" is an iconic image controlled by a mouse or other such devices, and is displayed on the video display device of a data processing system to indicate to a user icons, menus, or the like that may be selected or manipulated. In this case, the pointer is in the form of bar 256, which graphically indicates to the user viewable areas of screen 252, which occur with respect to top edge 257 and plastic bezel 254. In the depicted example, bar 256 is manipulated using pointing device 147 on remote control unit 106.

By manipulating pointing device 147, bar 256 may be moved as close as possible toward top edge 308, but yet remain visible as illustrated in FIG. 3B. When the user is satisfied that bar 256 is located as close to top edge 257 as possible within screen 252, but yet still visible, the user then may depress "Go" button 148 to indicate that the top edge of the display has been selected. In fact, a message box 278 is displayed within the area defined by bars 256, 258, 260, and 262. Message box 278 includes user instructions stating press "Go" when done, indicating that the user should press "Go" button 148 to indicate that the top edge of the display area has been defined.

Figure 3C:
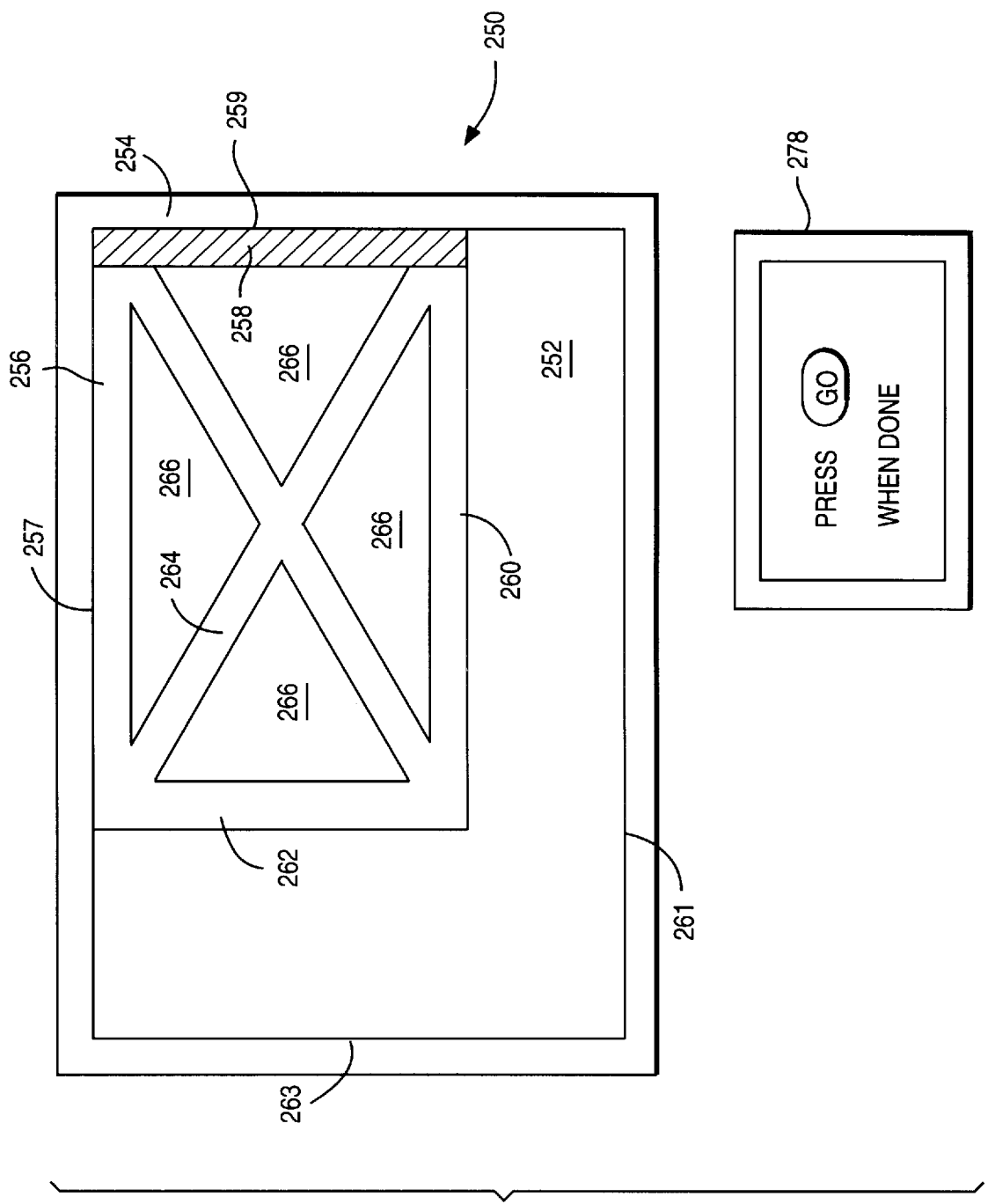
Figure 3D:
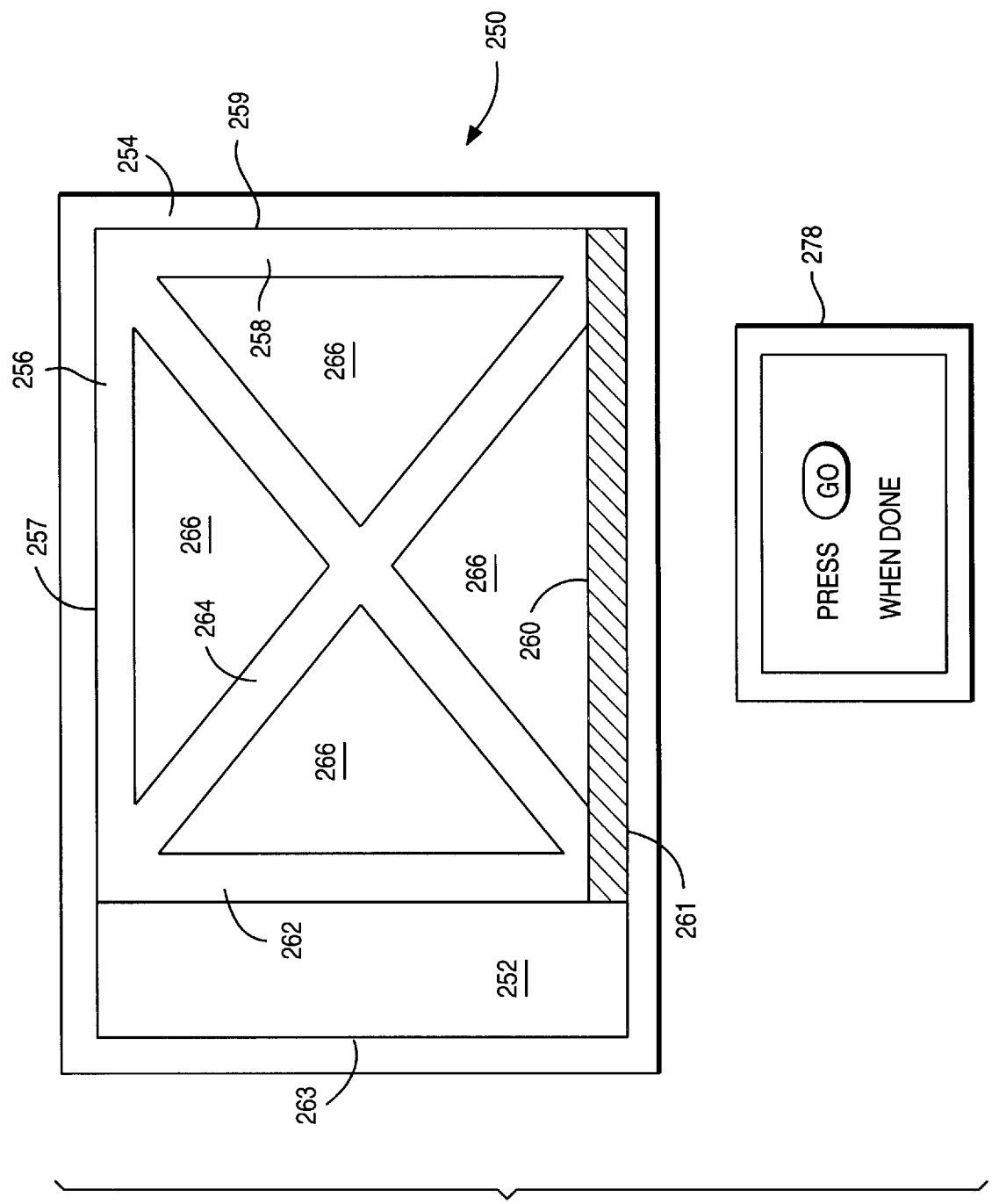
Figure 3E:
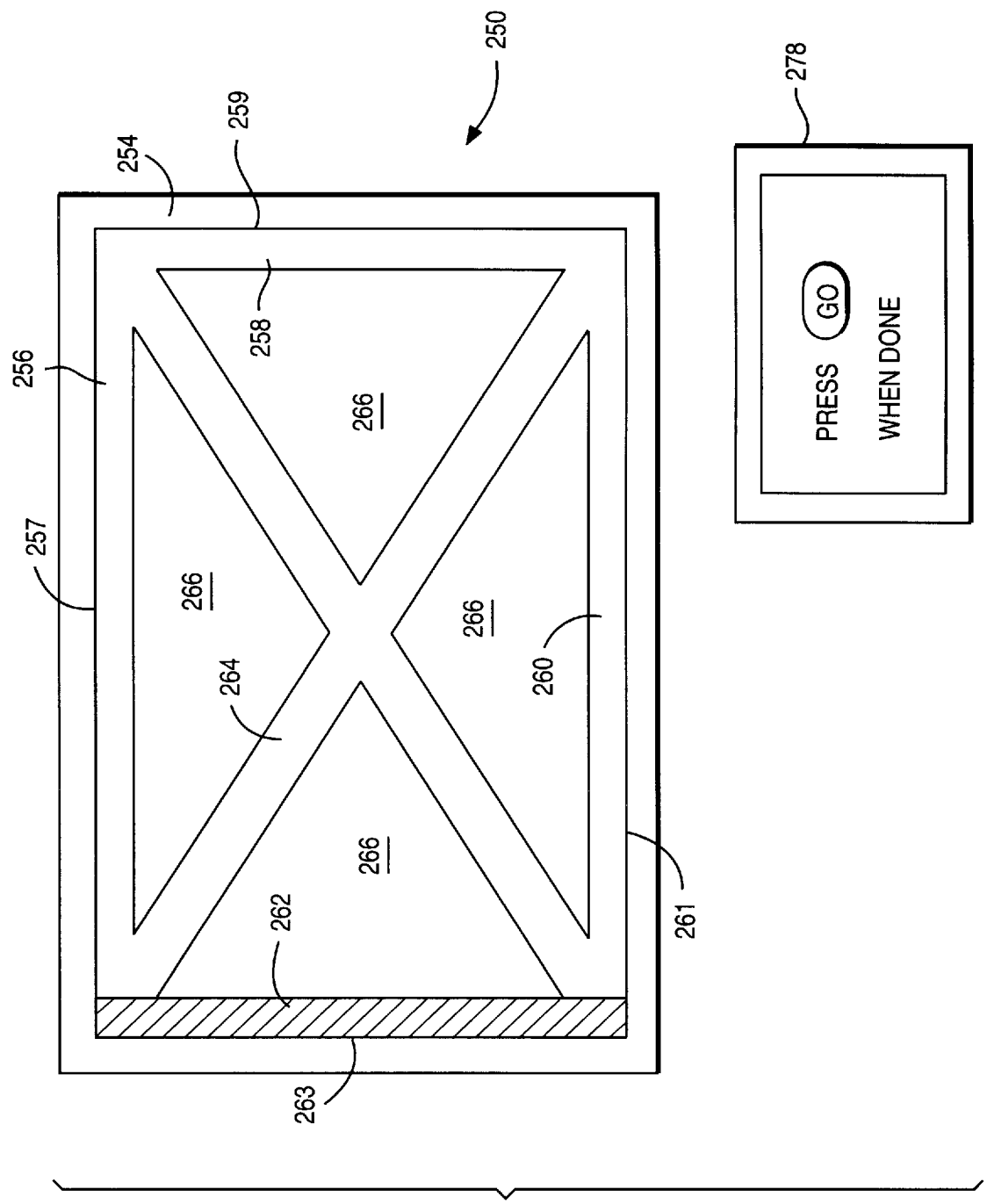

Thereafter, in FIG. 3C, bar 256 is no longer displayed in green because the top edge of the display area has been set. Next, bar 258 is displayed in green, rather than cyan blue, to indicate to the user that right edge 259 is now ready to be set. As with bar 256, bar 258 may be moved to the left and right with respect to right edge 259. The user typically moves bar 258 as close as possible to right edge 259 as illustrated in FIG. 3C. Again, message box 258 is displayed within border 255 to instruct the user to depress "Go" button 148 to fix the right edge of the displayable area. By fixing the right edge of the displayable area, the process then ceases to display bar 258 in green, and begins to display bar 260 in green to set the bottom edge of the displayable area, as illustrated in FIG. 3D. Again, the user manipulates bar 260 using pointing device 147 on remote control unit 106 to set the bottom edge of the displayable area with respect to bottom edge 261. Message box 278 is displayed to the user, and in response to the user depressing "Go" button 148, bar 260 is again displayed in cyan blue, and bar 262 is displayed in green to allow the user to set the left edge of the display area with respect of left edge 263, as depicted in FIG. 3E. When the user finishes setting the left edge of the display area and depresses "Go" button 148, a display area is defined within screen 252 by border 255.

Figure 3F:
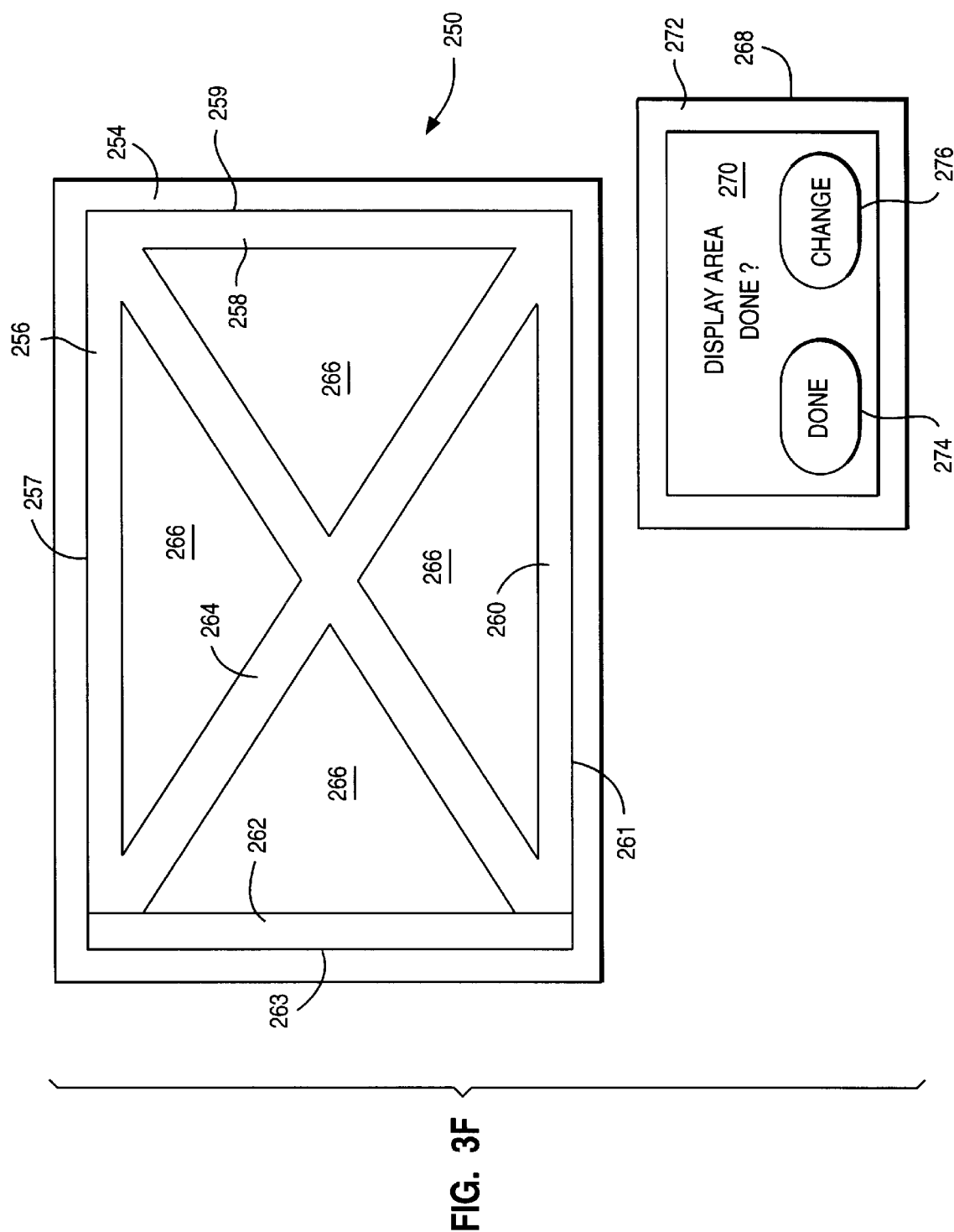
Figure 4A:
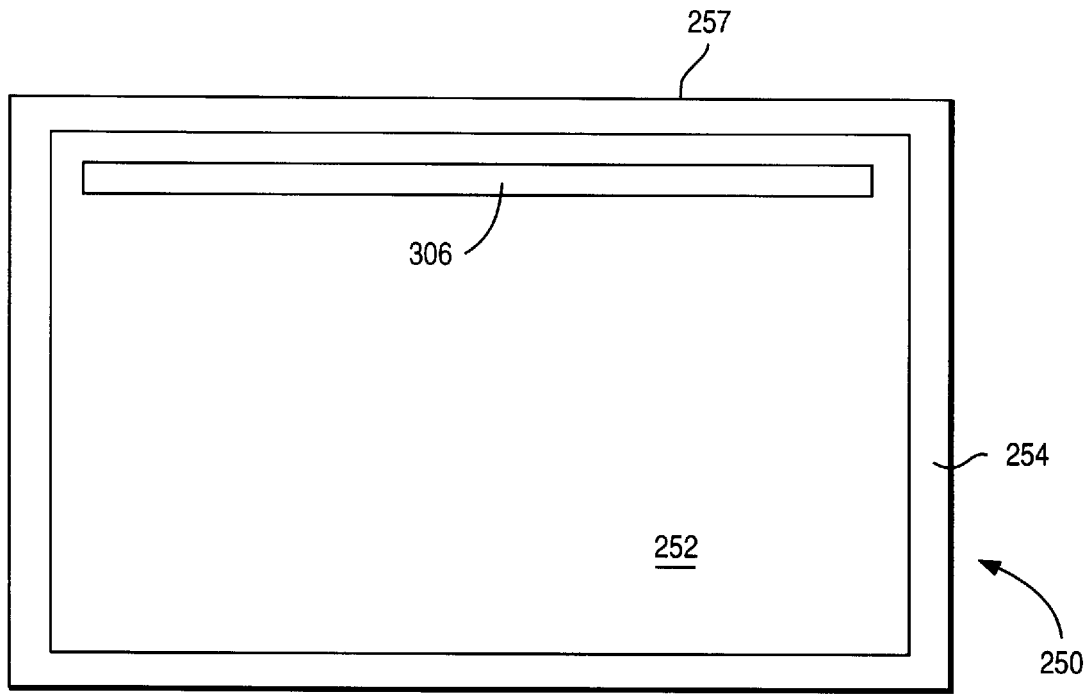
FIGS. 4A–4F are diagrams illustrating the selection of a display area according to the present invention.
Figure 4B:
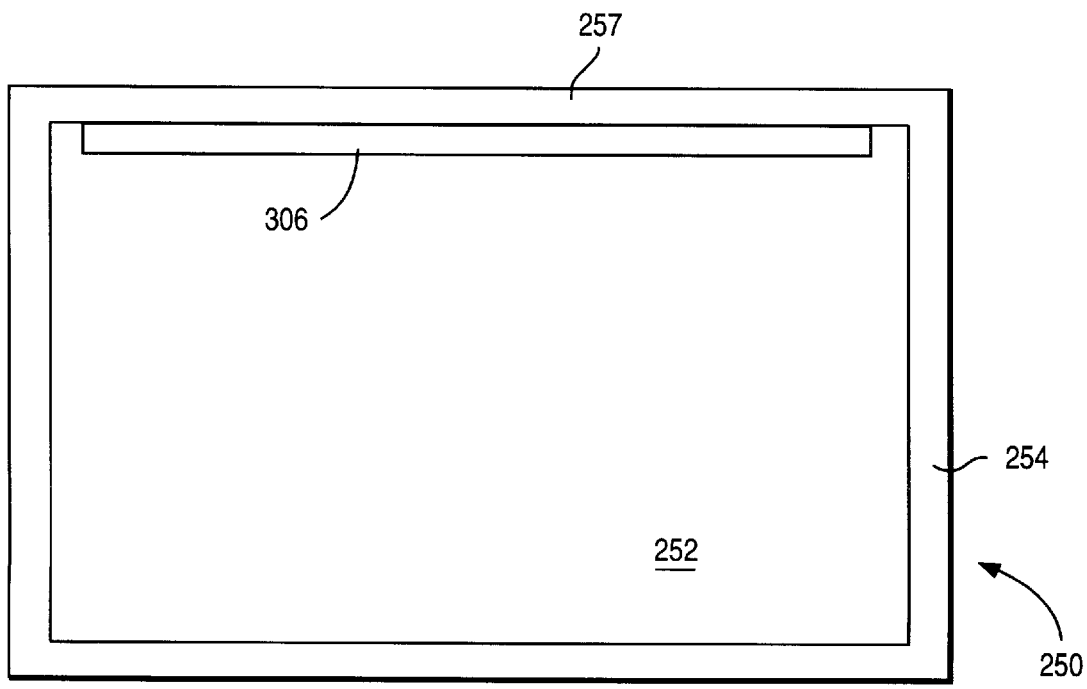
Figure 4C:
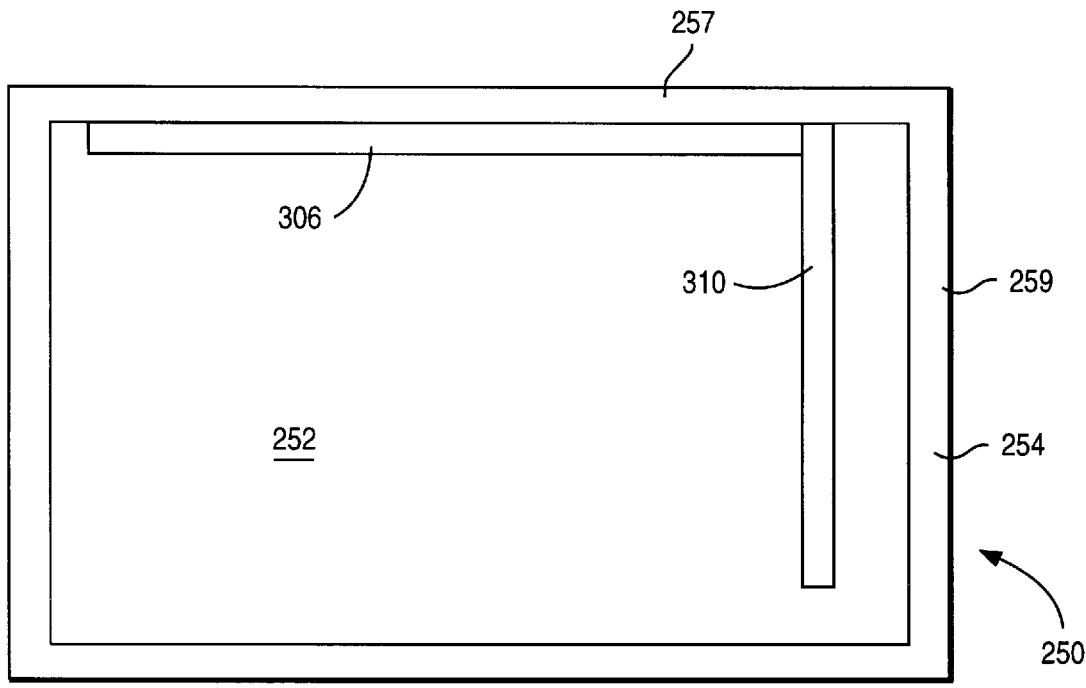
Figure 4D:
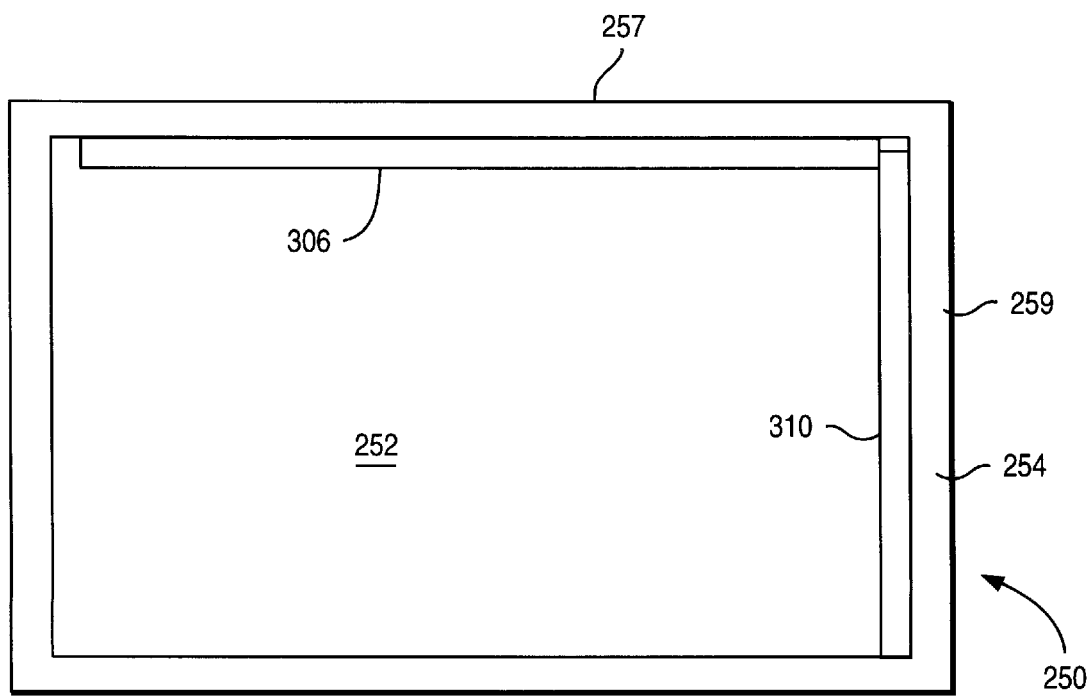
Figure 4E:
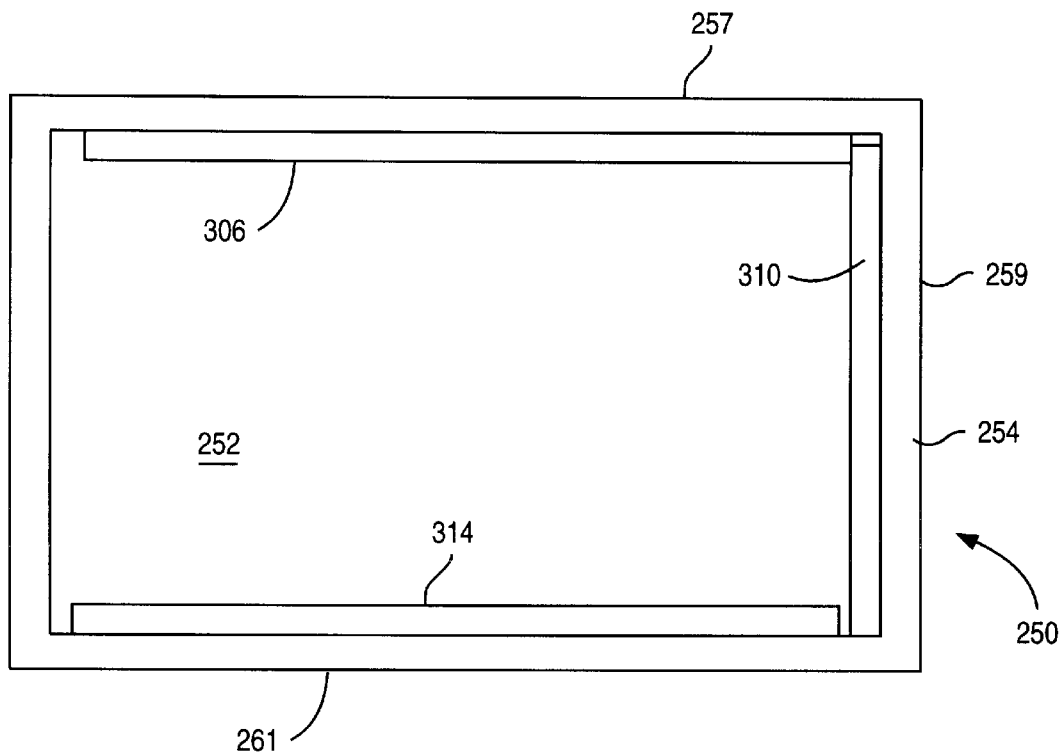
Figure 4F:
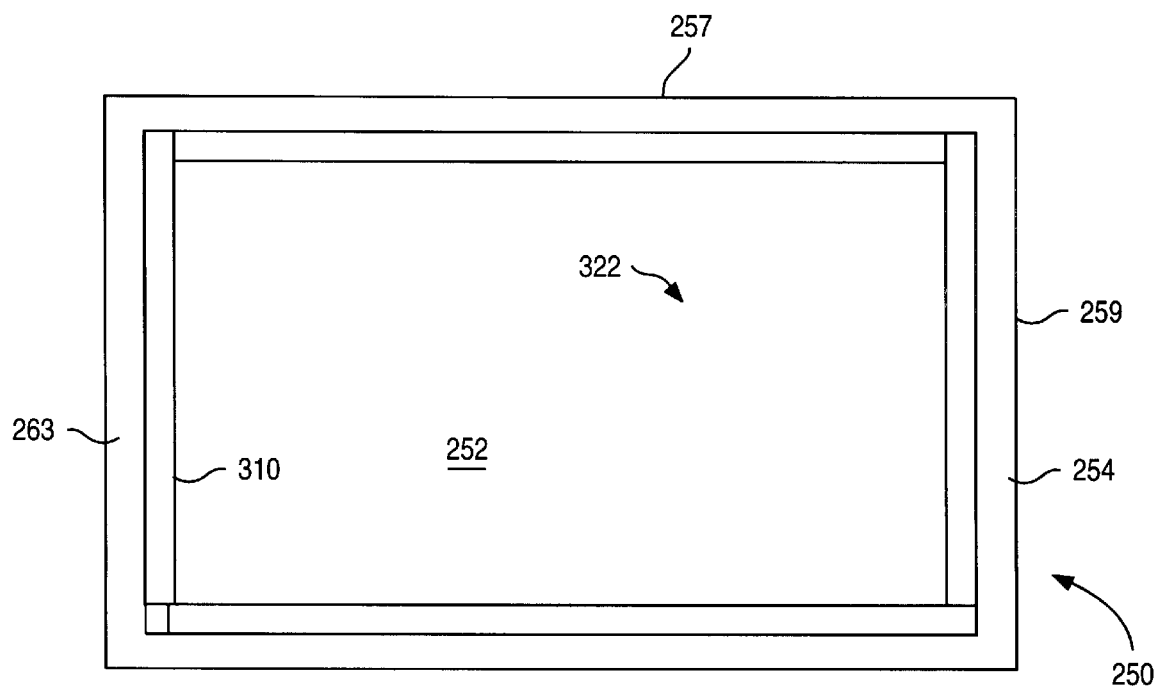

Ultimately in the depicted example, the display area fits within all of the viewable area of screen 252 and excludes unviewable areas covered by plastic bezel 254 in display device 250. Message box 268 is again displayed to the user, as shown in FIG. 3F. If the user is satisfied with the display area, the user depresses button 274 and the process stores the coordinates of the display area and uses those coordinates to display data to the user. If the user is not satisfied with the selected display area, the user would depress button 276 to begin the process again. In this way, the user may select various display areas. For example, a smaller display area may be selected based on various display qualities, such as the curvature of screen 252 in display device 250.

Message boxes 268 and 278 were depicted off screen 252 to simplify the explanation of the processes depicted in FIGS. 3A–3F. In actuality, these message boxes would be displayed in the center of the area defined by border 255. Additionally, although the edges of the display area were set in a clockwise fashion beginning with the top edge relative to top edge 257 defined by bezel 254, the edges may be set in any order.

In another example, as illustrated in FIGS. 4A–4F, a line or bar 306 is displayed parallel to a top edge 308 of screen 302. Of course other graphical objects may be employed to indicate the edge being set according to the present invention. Bar 306 may be moved up and down on screen 252, remaining parallel relative to top edge 257 of screen 252. Bar 306 may be manipulated using a pointing device such as a mouse or remote control. In fact, any operating system supported graphical user interface pointing device, including, but not limited to a mouse, track ball, light pen, touch screen, touch pad, and the like may be employed to move bar 306 in the depicted example. In the depicted example, the pointer is in the form of bar 306, which graphically indicates to the user where viewable areas of screen 252 occur with respect to top edge 257 and plastic bezel 254. In the depicted example, bar 306 is manipulated using pointing device 147 on remote control unit 106. By manipulating pointing device 147, bar 306 may be moved as close as possible toward top edge 257 but yet remain visible as illustrated in FIG. 3B. When the user is satisfied that bar 306 is located as close to top edge 257 as possible within screen 252, but yet still visible, the user may then depress "Go" button 148 to indicate that the top edge of the display area has been selected.

After setting the top edge of the displayable area using bar 306, a bar 310 is displayed parallel to right edge 259 of display device 250. As with bar 306, bar 308 may be moved left and right with respect to right edge 259. The user typically moves bar 310 as close as possible to right edge 259 as shown in FIG. 3D. At that point, the user would depress "Go" button 148 to fix the right edge of the displayable area. Thereafter, a bar 314 is displayed parallel to bottom edge 261 and the user manipulates bar 314 to set the bottom edge of the displayable area within screen 252 of display device 250. Again, after the bottom edge has been set using bar 314, the user depresses "Go" button 148 to set the bottom edge of the display area. Then, bar 318 is displayed parallel relative to left edge 263 and the user manipulates bar 318 using remote control unit 106 until the user is satisfied with the location of bar 318 with respect to left edge 263, as illustrated in FIG. 3F. When the user sets the left edge using "Go" button 148, a display area 322 is defined within screen 252, Optimally, display area 322 fits within all of the viewable area of screen 252 and excludes unviewable areas covered by plastic bezel 254 in display device 250. Of course, a user may select other displayable areas other than that depicted in FIG. 3F. For example, a smaller displayable area may be selected based on various display qualities that may be affected by curvature of screen 252.

Additionally, although the depicted example employs bars to define the display area, other graphical objects may be employed to define the display area. For example, a single line may be employed or a solid triangle having an edge that is manipulated with respect to the edge of the display area being set may be utilized according to the present invention. Of course, other numbers of edges may be set depending on the shape of the viewing device although the most common shape includes only four sides.

Figure 5:
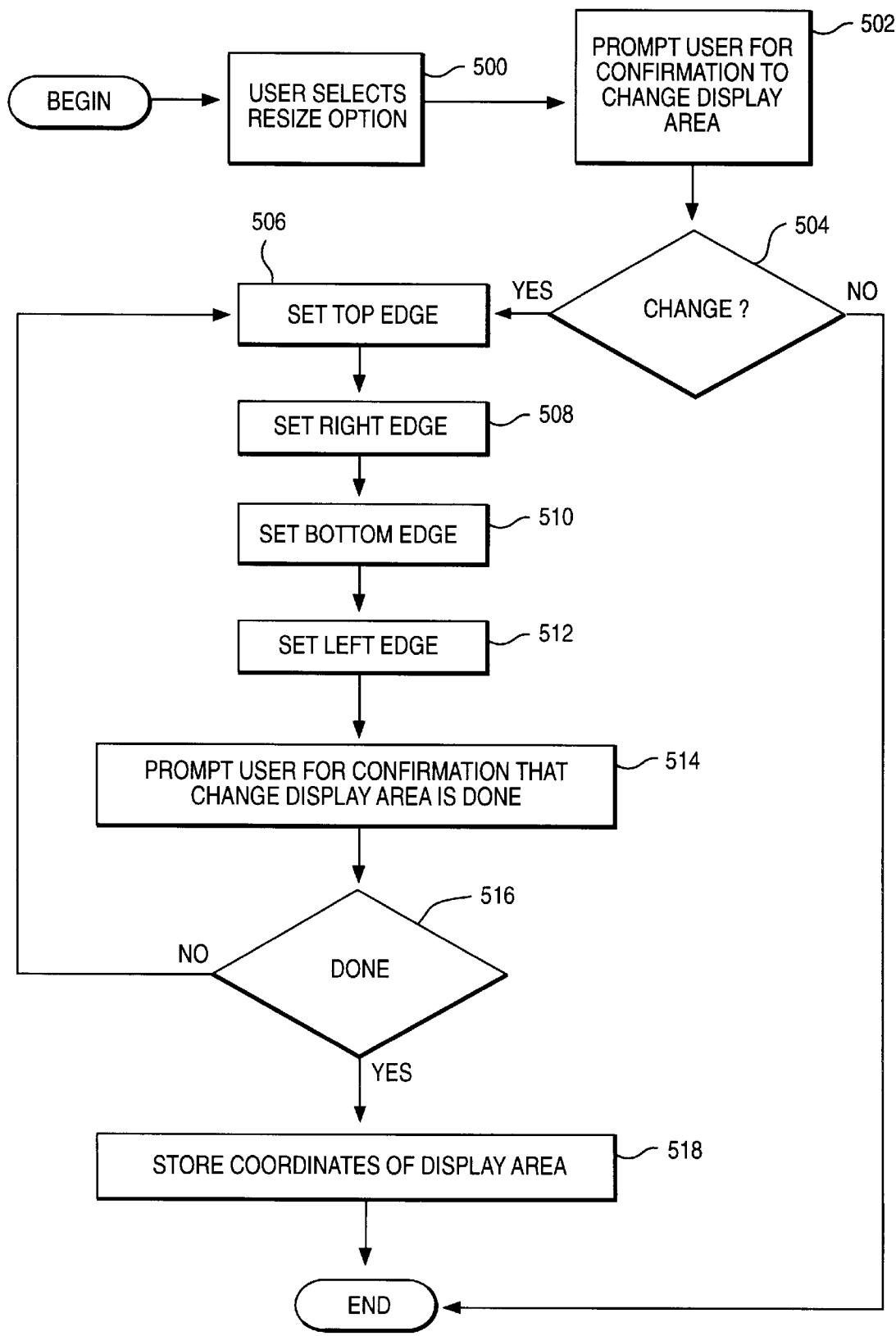
FIG. 5 is a flowchart of a process to select a display area according to the present invention.

With reference now to FIG. 5, a flowchart of a process to select a display area is depicted according to the present invention. The process begins by the user selecting a resize option (step 500). In the depicted example, such an option may be selected using remote control 106. The process then prompts the user for a confirmation to change the display area (step 502). In the depicted example in FIGS. 3A–3F, the confirmation is in the form of message box 268. Thereafter, a determination is made as to whether the user has decided to change the display area (step 504). If the user decides not to change the display area, the process terminates. Otherwise, the user then sets the top edge of the display area (step 506). Thereafter, the right edge of the display area is set (step 508) and the bottom edge of the display area is set (step 510). Finally, the left edge of the display area is set by the user (step 612). Thereafter, the process prompts the user for a confirmation that the change to the display area is done (step 514). In FIGS. 3A–3F, this prompt is in the form of message box 278. A determination is then made as to whether the user is done with changes to the display area (step 516). If the user is not done, the process returns to step 506. Otherwise, the coordinates of the display area defined by the user are stored (step 518) with the process terminating thereafter.

Figure 6:
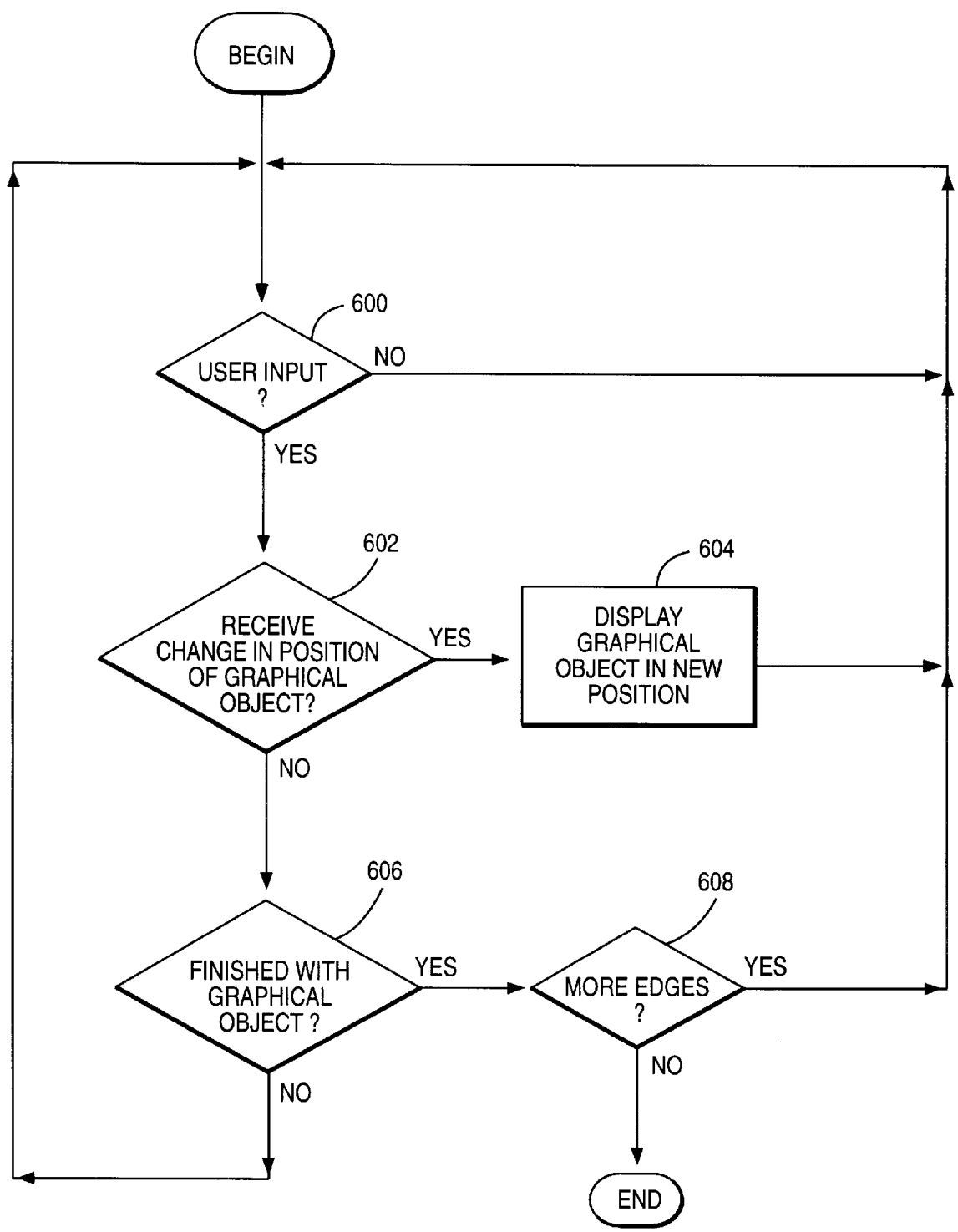
FIG. 6 is a flowchart of a process for setting an edge in a display area according to the present invention.

With reference now to FIG. 6, a flowchart of a process for setting an edge in a display area is depicted according to the present invention. The process begins by determining whether a user input has occurred (step 600). If a user input has not occurred, the process returns to step 600. Upon the receipt of a user input, a determination is made as to whether the user input is a change in the position of the graphical object displayed on the screen of the display device (step 602). If the input is a change in the position of the graphical object, the process then displays the graphical object in the new position on the screen of the display device (step 604) with the process then returning to step 600. Otherwise, the process then determines whether the user input indicates that the user is finished manipulating the graphical object and has set the edge of the display area (step 606). In the depicted example, the selection or setting of the edge may be indicated by depressing "Go" button 148 on remote control unit 106. If the user is finished manipulating the graphical object and has set the edge, the process then determines whether additional edges are to be set (step 608). If additional edges are to be set, the process then returns to step 600. Otherwise, the process then terminates. With reference again to step 606, if the user input does not indicate that the edge has been set, the process also returns to step 600.

Figure 7:
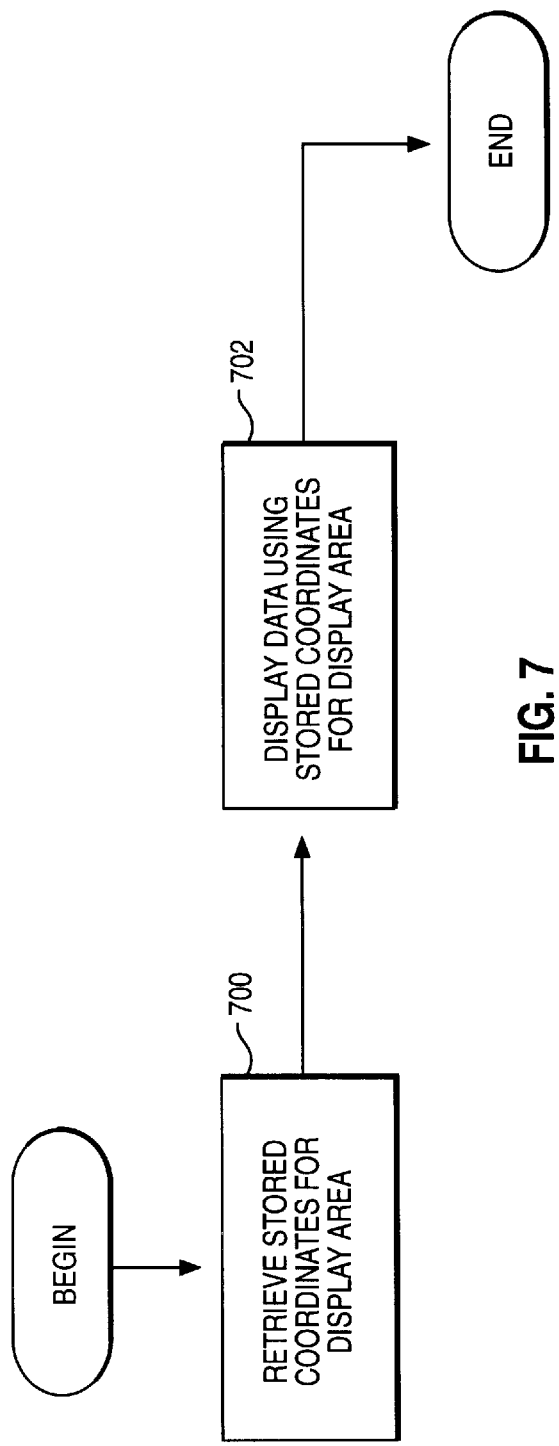
FIG. 7 is a flowchart of a process for displaying data using stored coordinates of the display area according to the present invention.

With reference now to FIG. 7, a flowchart of a process for displaying data using the stored coordinates of the display area is depicted according to the present invention. The process begins by retrieving the coordinates of the display area (step 700). Thereafter, the process displays data using the stored display coordinates (step 702) with the process terminating thereafter. Displaying date using the coordinates may involve providing a window that may be scrolled to view data that normally would be displayed on screen 252, but unviewable because of plastic bezel 254. In this manner, a user may scroll to view the data that normally would be unviewable. Alternatively, the data may be reformatted to fit within the displayable area defined by the coordinates of the display area set by the user. The display area, in the depicted example, sets the window size of the application to fit in the display area. As a result, scrolling happens automatically based on window size.

It is important to note that while the present invention has been described in the context of a fully functioning data processing system, those of ordinary skill in the art will appreciate that the processes of the present invention are capable of being distributed in a form of a computer readable medium of instructions and a variety of forms and that the present invention applies equally regardless of the particular type of signal bearing media actually used to carry out the distribution. Examples of computer readable media include: recordable-type media such a floppy discs and CD-ROMs and transmission-type media such as digital and analog communications links.

The description of the preferred embodiment of the present invention has been presented for purposes of illustration and description, but is not limited to be exhaustive or limited to the invention in the form disclosed. Many modifications and variations will be apparent to those of ordinary skill in the art. That the embodiment was chosen and described in order to best explain the principles of the invention the practical application to enable others of ordinary skill in the art to understand the invention for various embodiments with various modifications as are suited to the particular use contemplated.

What is claimed is:

1. A method in a data processing system for defining a display area within a display device in the data processing system, wherein the display device includes a plurality of borders defining a viewable portion of the display device, the method comprising: the computer implemented steps of:

displaying graphical object within the plurality of borders of the display device, wherein the graphical object indicates an edge parallel to a border within the plurality of borders;

moving the graphical object in response to a first user input, wherein the edge indicated by the graphical object moves relative to the border;

setting the edge in response to a second user input;

repeating the displaying, moving, and setting steps for each of the remaining borders within the plurality of borders, wherein an entire viewable display area is defined within the display device for all displayed data and outside of which no displayed data may be viewed; and storing the display area in response to the defining of the display area, wherein the stored display area is used to display data on the display device.

2. The method of claim 1, wherein the step of displaying a graphical object within the plurality of borders of the display device comprises displaying a bar within the plurality of borders of a display device, wherein the bar is displayed parallel to the border.

3. The method of claim 1, wherein the step of storing the display area includes storing coordinates of the display area.

4. The method of claim 1 further comprising displaying data on the display device using the stored display area.

5. The method of claim 3, wherein the step of storing the display areas includes storing coordinates of the display area and wherein the step of displaying data on the display device using the stored display area includes displaying data on the display device using the coordinates of the display area.

6. A method in a data processing system for defining a display area within a display device in the data processing system, wherein the display includes an unviewable portion of the display and includes a plurality of borders defining a viewable portion of the display device, the method comprising the computer implemented steps of:

(a) displaying a line parallel to a border within the plurality of borders within the display device;

(b) moving the line relative to the border in response to a first user input, wherein the line remains parallel to the border;

(c) fixing the line in response to a second user input;

(d) repeating steps (a)–(c) for the remaining ones of the plurality of borders wherein an entire viewable display area is defined for all displayed data and outside of which no displayed data may be viewed; and (e) storing the display area in response to defining the display area.

7. The method of claim 6 further comprising displaying a graphic user interface such that the graphic user interface is displayed within the display area in the display device.

8. A data processing system having a display device, wherein the display device includes a plurality of borders defining a viewable portion of the display device, the data processing system comprising:

display means for displaying a graphical object within the plurality of borders of the display device, wherein the graphical object indicates an edge parallel to a border within the plurality of borders;

moving means for moving the graphical object in response to a first user input, wherein the edge indicated by the graphical object moves relative to the border;

setting means for setting the edge in response to a second user input, wherein an entire viewable display area for all displayed data, outside of which no displayed data may be viewed, is defined in response to setting an edge for each of the plurality of borders of the display device; and storage means for storing the display area, wherein the stored display area is used to display data within the display device.

9. The data processing system of claim 8, wherein the graphical object is a bar.

10. The data processing system of claim 8, wherein the first user input is a signal generated by a pointing device.

11. The data processing system of claim 8, wherein the storage means includes means for storing coordinates of the display area.

12. The data processing system of claim 8 further comprising display means for displaying data on the display device using the stored display area.

13. The data processing system of claim 12, wherein the storage means includes means for storing coordinates of the display area and wherein the display means includes means for displaying data on the display device using the coordinates of the display area.

14. A computer program product for use with a data processing system to define a display area within a display device in the data processing system, wherein the display device includes a plurality of borders defining a viewable portion of the display device, the computer program product comprising:

a computer usable medium;

first instruction for displaying a graphical object within the plurality of borders of the display device, wherein the graphical object indicates an edge parallel to a border within the plurality of borders;

second instructions for moving the graphical object in response to a first user input, wherein the edge indicated by the graphical object moves relative to the border;

third instructions for setting the edge in response to a second user input, wherein an entire viewable display area for all displayed date, outside of which no displayed data may be viewed, is defined within the display device in response to setting an edge with respect to each of the plurality of borders; and fourth instructions for storing the display area in response to the defining of the display area, wherein the stored display area is used to display data within the display device, wherein the instructions are embodied within the computer usable medium.

15. The computer program product of claim 14, wherein the computer usable medium is a floppy disk.

16. The computer program product claim of claim 14, wherein the computer usable medium is a read-only memory.

17. The computer program product of claim 14, wherein the computer usable medium is a hard disk drive.

18. The computer program product of claim 14, wherein the computer usable medium is a digital communications link.

* * * * *

UNITED STATES PATENT AND TRADEMARK OFFICE
CERTIFICATE OF CORRECTION

PATENT NO. : 5,867,154
DATED : February 2, 1999
INVENTOR(S) : Berstis et al.

It is certified that error appears in the above-identified patent and that said Letters Patent is hereby corrected as shown below:

On column 5, line 47, please delete "VO.42bis, V34bis, VO.34, VO.17" and insert --V.42bis, V34bis, V.34, V.17--.

On column 6, line 32, please delete "264" and insert --254--.

Signed and Sealed this

Third Day of August, 1999

Attest:

Attesting Officer

Q. TODD DICKINSON

Acting Commissioner of Patents and Trademarks